Figure 1:
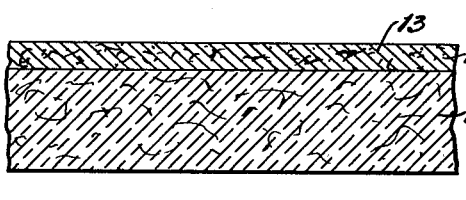
Figure 2:
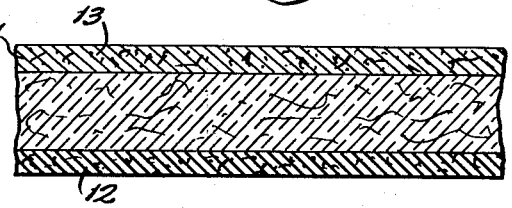

Oct. 19, 1954     G. SLAYTER ET AL     2,692,219

STRUCTURAL PANEL

Filed July 5, 1951

INVENTORS:
James Slayter
and Marshall C. Armstrong,
BY Stebbins & Coleman
ATTORNEYS.

Patented Oct. 19, 1954

2,692,219

UNITED STATES PATENT OFFICE 2,692,219

STRUCTURAL PANEL

Games Slayter, Newark, and Marshall C. Armstrong, Hebron, Ohio, assignors to Owens-Corning Fiberglas Corporation, Toledo, Ohio, a corporation of Delaware Application July 5, 1951, Serial No. 235,266

12 Claims. (Cl. 154—44)

This invention relates to the manufacture of structural boards for use as partition panels, heat and sound insulation and the like. It relates more particularly to paneling of the type described fabricated substantially completely of inorganic materials and which embodies reinforcement by way of glass fibers to impart strength and some degree of flexibility to the board.

It is an object of this invention to produce and to provide a method for producing paneling of the type described characterized by high strength, good heating and sound insulation and which is composed almost completely of inorganic heat resistant materials.

Another object is to produce structural panels of the type described characterized by high core of bonded glass fibers having one or more layers of inorganic cement integrated with the surfaces thereof in a manner to resist delamination and it is a related object to provide means for increasing the integrity of the laminate transversely through the board.

A further object is to produce a substantially porous board of low cost ceramic material and to provide a method for producing the same.

These and other objects and advantages of this invention will hereinafter appear and for purposes of illustration, but not of limitation, embodiments of the invention are shown in the accompanying drawings in which Figures 1–7 are schematic sectional elevational views of modifications of boards embodying features of this invention.

In accordance with this invention, a structural board is fabricated to include a central core 10 or base member formed of glass fibers bonded into a self-sufficient porous board with a resinous material, preferably of the thermosetting type, such as a phenol formaldehyde resin, urea formaldehyde resin, furfuryl alcohol-acid catalyzed resin, polyester and unsaturated polyester resins and the like. Porous base boards or core members suitable in the practice of this invention are often referred to as insulation board which is highly porous in nature and fabricated to a density ranging from 6–20 pounds per cubic foot and preferably ranging from 9–12 pounds per cubic foot. Board of the type described may be manufactured in accordance with the teachings in patents of Bergin and Simison, No. 2,252,157, issued on August 12, 1941, and No. 2,335,102, issued on November 23, 1943.

Laminated onto one or both sides of the porous, fibrous base member or core 10 are layers 11 and 12 formulated of an inorganic cementitious composition based upon a magnesium oxysulphate cement compounded of magnesium oxide and magnesium sulphate present in the ratio of 3–9 molecular equivalents of the oxide to one molecular equivalent of the sulphate, preferably in the form of the heptahydrate ($MgSO_4.7H_2O$) with sufficient water added to account for 11 mols. As of itself, the inorganic cement is relatively weak and brittle and actually is unsuitable for use as a structural product where strength, heat resistance and flameproofness pose possible requirements. It has been found, however, that the necessary strength properties can be readily secured by a formulation which includes the cement forming ingredients within the ratio described in combination with glass fibers 13 of reinforcing lengths and aggregate 20 in the ratio of 1–6 parts by weight aggregate to one part by weight of magnesium oxide.

In fabrication of the type described, it is desirable to incorporate as much glass fiber in the cement composition as is possible consistent with the ability of working the cement slurry for application and integration of the applied coating with the fibrous porous base board 10. Within the limits of water addition for the development of optimum strength properties, it is possible to incorporate as much as 10 percent by weight glass fiber but more often the amount which can be incorporated lies in the range of about 2–5 percent by weight of the slurry.

The glass fiber component may be incorporated into the slurry in various forms, such as cut or chopped staple fibers in filament or yarn form. It is preferred to make use of strands of glass fibers composed of hundreds of filaments bonded together with a suitable size and cut or chopped to lengths of about ¼–4 inches. In the event that the fibers are derived of continuous filaments upon which a size has been applied, it is preferred to make use of a size composition formed of melamine formaldehyde resin, especially when high flexure strength is desired. Excellent use may also be made of a size formed of water soluble alkyd resins in the form of a water soluble condensation product of a polyhydric alcohol with a polybasic acid or styrene-butadiene copolymer, urea formaldehyde water soluble resin or the like.

As the magnesium oxide component, calcined magnesia from various sources, such as from sea water, natural deposits of magnesite, or brine wells such as the calcined brucite from Luddington, Michigan, may be used. It is preferred to use the magnesias of high bulk density ranging from 50–60 pounds per cubic foot from natural deposits and the brine wells of Luddington, Michigan, rather than that from sea water with bulk density of 30-35 pounds per cubic foot. The high bulk density magnesia makes cements with less volume change on curing and also makes possible the preparation of lower viscosity or thinner slurries with equivalent amounts of water or the incorporation of larger amounts of glass fibers for securing greater strengths under comparable conditions.

Calculated on a weight basis excellent results have been secured when 1.5-3 parts by weight of magnesia are combined with 3 parts by weight magnesium sulphate preferably in the form of Epsom salts, which is the heptahydrate. It is preferred to have the materials present in the ratio of about 2-3 parts magnesia to 3 parts by weight of Epsom salts. When magnesium sulphate is present in amounts less than 20 percent by weight, the hydrate of magnesia, $Mg(OH)_2$, seems to be produced instead of forming a solid solution with the sulphate with the result that a weak cement is formed.

Aggregate suitable for use in combination with the glass fibers in the manufacture of cement having improved strength properties may be selected of siliceous material, such as sand, flint, slate, mica dust, glass wool sandings or glass cullet, chalk, talc and the like. It is preferred to make use of a combination of aggregate part of which is uniformly fine and part of which is uniformly coarse. When such aggregate mixtures are used they should be present in the ratio of 3-5 parts by weight coarse aggregate of about 20-60 mesh to about 1-3 parts by weight aggregate in which over 70 percent passes through a 200 mesh screen. Instead of using a well defined mixed aggregate of large and small particle size, it is possible to achieve the desired results by the use of aggregate in which the particle size is distributed from fine to coarse.

In practice, a slurry is formed of the cement components and aggregate and then the glass fibers are incorporated therein. Surface active agents may be used to enhance the wetting out of the aggregate and glass fibers but usage thereof is not essential.

Instead of mixing the anchoring fibers, with or without a wetting agent on the fiber surfaces, with the cement slurry and then troweling the slurry onto the interface, it has been found that the desired results can be achieved when the fibers and slurry are simultaneously sprayed onto the porous base board, as from a gun having concentric barrels for mixing prior to deposition or from separate source for mixing upon deposition at the interface.

Application of the cement slurry to form layers 11 and 12 on the porous core 10 may be accomplished by troweling or by spraying technique. When applied by either system or by other suitable means, the surface of the porous glass fiber core permits just enough penetration of the cement slurry to integrate the layers into a composite board which resists delamination.

Even though the bonded relation of the layers is sufficient to resist delamination responsive to forces operating during normal use, failures have occurred by reason of the fact that the integrity of the bonded mat or core was insufficient to resist separation. An important concept of this invention resides in a new and novel means and method for integrating the layers and simultaneously introducing transverse reinforcement to resist separation within the layers or between the layers. This technique, illustrated in Figures 4-6 inclusive, comprises the use of a porous, glass fiber bonded base board 10 of the type described through which a continuous strand or thread 14 of glass fibers is stitched in a manner to provide looped ends 15 extending outwardly from the face of the core for anchorage into the applied cementitious layers 11 and 12. Thus the continuous threads of glass fiber become a part of the core and anchor into the cement layer so as to tie the two together in a manner to resist separation by forces incident to normal use.

In practice, strands or threads of continuous glass fibers are stitched through the base board on closely spaced centers, such as on centers of 2 inches, with the length of the looped ends extending from the faces thereof dimensioned to be less than the thickness of the cement layer to be formed thereon. Instead of strands or threads of continuous fibers, yarns of discontinuous fibers felted together in bundles and drafted to endless lengths may be used. It has been found that the looped ends of the stitched glass fiber yarns or strands function as reinforcement in the cementitious layer. When sufficient glass fiber is introduced by this technique, the amount of glass fiber incorporated into the cementitious slurry for reinforcement may be reduced to about 2-3 percent or else completely eliminated.

Figure 3:
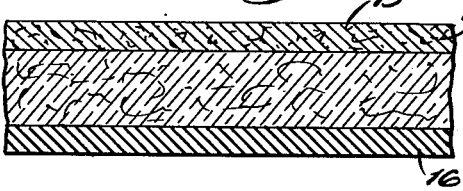
Figure 6:
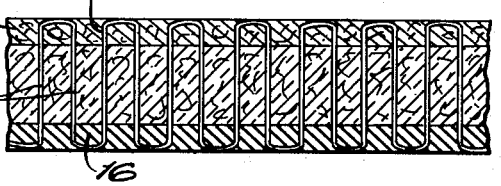
Figure 7:
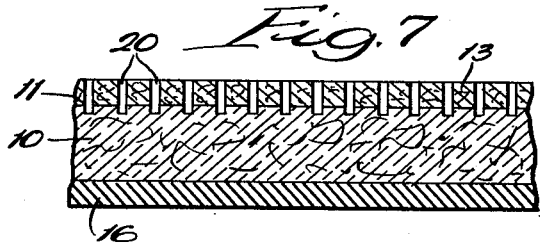

When a moisture barrier is desired in the structural board, one of the faces of the porous core may be provided with a substantially continuous layer 16 of an asphaltic composition or resinous material, preferably applied by way of a hot melt or from aqueous dispersion having high solids content. A construction of this type is illustrated in Figure 3. With the practice heretofore described for integrating the applied layers with the core by the use of continuous strands of glass fibers stitched through the core and having looped ends, the looped ends become embedded also in the asphaltic layer to integrate the layer into a composite structure, as illustrated in Figure 6.

Figure 4:
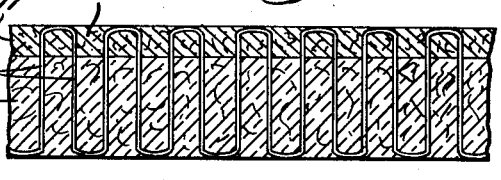
Figure 5:
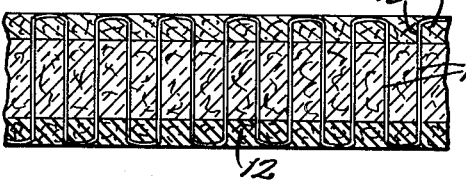

In the event that only one of the surfaces of the core is to have a layer applied thereon to form the composite structural board, as shown in Figure 4, it is expedient, though not necessary, to apply a thin coat of the cementitious material or other bonding agent onto the free surface to anchor the offset ends of the integrating glass fiber threads stitched through the structure.

After the slurry has been applied onto one or more of the faces of the porous glass fiber bonded core, the structure may be heated for about 10-60 minutes at a temperature ranging from 150-200° F. until the cement is cured. Thereafter, if the cement is allowed to age for 1-6 days higher strengths will be developed.

By way of illustration, but not by way of limitation, the following sets forth examples of slurry which may be used in the practice of this invention and the method of fabrication thereof in the manufacture of structural boards embodying the concepts of this invention.

*Example 1*

100 parts by weight magnesia (Sierra grade)
150 parts by weight magnesium sulphate ($MgSO_4.7H_2O$)
200 parts by weight silica (89% through 200 mesh)
300 parts by weight Ottawa sand (30-60 mesh)

40 parts by weight glass fibers in the form of strands sized with melamine formaldehyde resin and cut to 1 inch lengths
150 parts by weight water

*Example 2*

100 parts by weight magnesium oxide
100 parts by weight magnesium sulphate
100 parts by weight Silex (95% through 200 mesh)
300 parts by weight sand (30-60 mesh)
20 parts by weight glass fiber yarns cut to ½ inch lengths
150 parts by weight water

*Example 3*

100 parts by weight magnesium oxide (brucite)
150 parts by weight magnesium sulphate heptahydrate
100 parts by weight Silex sand (95% through 200 mesh)
300 parts by weight sand (30-60 mesh)
10 parts by weight glass fibers in the form of yarns cut to 2 inch lengths
150 parts by weight water

*Example 4*

100 parts by weight magnesium oxide
200 parts by weight magnesium sulphate heptahydrate
200 parts by weight potter's flint
300 parts by weight sand (30-60 mesh)
35 parts by weight glass fibers in the form of strands cut to 1 inch lengths
150 parts by weight water

*Example 5*

200 parts by weight calcined brucite
400 parts by weight Silex
600 parts by weight milled glass wool
300 parts by weight magnesium sulphate
60 parts by weight glass fiber yarns cut to lengths ranging from ¼–4 inches
300 parts by weight water In each of the above examples the magnesium sulphate is dissolved in water and placed in a mixer. The magnesia is slowly added and allowed to wet out before mixing is started. While mixing, the aggregate and glass fibers 13 are added and stirring is continued for about 10 minutes.

In practice, a wetting agent such as octadecylamine acetate is sprayed onto the surface of a glass fiber-phenol formaldehyde bonded board 10 having a density of about 9 pounds per cubic foot and a thickness of about ¾ inch. A slurry of the type formed in Examples 1-5 is troweled onto the surface to form a smooth, substantially non-porous layer having a thickness of about ⅛ inch. The thickness of the applied coating may vary depending upon the specific requirements of the structural product. However, it is preferred to limit the thicknesses to between $\frac{1}{16}$ and ½ inch. The cement layer is then heated in an air circulating system for 20 minutes at 170° F. and then allowed to cool to room conditions to harden the cement. Thereafter the material should be aged for about 24 hours to 6 days at room conditions to develop optimum properties. Instead of forming a smooth surface on the applied slurry, the surface may be textured by cure and contact with a suitable mold or a desired texture may be formed on the surface in advance of the curing operation.

The same technique may be followed in the event that the core is stitched with glass fiber threads 14, such as upon 2 inch centers leaving loops extending from the surfaces for embedment into the applied layer by way of reinforcement and a tie-in to integrate the layers. When a stitched core is used with loops extending therefrom, the application of a wetting agent may be dispensed with and a slurry having less concentration of reinforcing fiber may be used, such as the slurry of Example 3. When looped ends are to become embedded within the applied cementitious layer, better integration of the type desired will be achieved if the slurry is sprayed onto the surface of the core.

For sound insulation it has been found beneficial to fabricate the panels with a number of openings 20 extending through the substantially non-porous cement layer. The openings may extend through to the porous core of bonded fibers or into and partially through the porous base board for dissipating sound vibrations. Suitable openings may be formed by the use of inserts embedded in the cementitious layer or else they may be formed therein subsequent to cure or by a drilling operation.

The concepts of this invention may also be practiced by the use of a cement of the magnesium oxychloride type. With magnesium oxychloride, the desired results are secured by the use of aggregate and glass fibers in substantially the same proportion as employed with magnesium oxysulphate cement, as illustrated by the following example.

*Example 6*

1 part by weight magnesium oxide, 1 part by weight Silex (95% through 200 mesh), 1–5 parts by weight sand (20–30 mesh) and 0.05 part by weight glass fibers of reinforcing lengths are combined and gauged to mortar consistency with a 22° Baumé magnesium chloride solution. After troweling or spraying the slurry to form the desired layer on the porous core 10, the mass may be allowed to cure at room temperature but it is preferred to effect cure by raising the temperature gradually to about 110° F.

It will be apparent from the description that a substantially inorganic structural panel may be fabricated in accordance with this invention having a central porous core faced with substantially non-porous inorganic cementitious layers of fairly high strength which provide a surface capable of modification to develop improved appearance such as by texturing or by coating with paint or the like. A structure embodying features of this invention comprises layers of materials which are integrated as well as tied into each other in a manner to resist separation as an incidence to normal use such that the strengths of the layers are cumulative to provide board capable of use as partition panels, siding, structural board, insulation board and the like.

It will be understood that changes may be made in the details of construction and formulation without departing from the spirit of the invention, especially as defined in the following claims.

We claim:

1. A structural board comprising a core of glass fibers bonded into a porous layer and a layer of an inorganic cementitious composition integrated with the surface and formed of components present in the ratio of 3–9 molecular equivalents magnesium oxide to one molecular equivalent magnesium sulphate, siliceous aggregate and reinforcing glass fibers present in an amount ranging from 1 to 10 percent by weight.

2. A structural board comprising a core of glass fibers bonded into a porous layer and a layer of an inorganic cementitious composition integrated with at least one of the surfaces of the core the components of which consist essentially of magnesium oxide and magnesium sulphate present in the ratio of 3–9 molecular equivalents magnesium oxide to one molecular equivalent magnesium sulphate, 1–6 parts by weight aggregate to one part by weight magnesium oxide, and 2–10 percent by weight reinforcing glass fibers.

3. A structural board comprising a core of glass fibers bonded into a porous layer and a layer of an inorganic cementitious composition integrated with at least one of the surfaces of the core and formed of a composition consisting essentially of magnesium oxide and magnesium sulphate present in the ratio of 3–6 molecular equivalents magnesium oxide to one molecular equivalent magnesium sulphate, 1–6 parts by weight aggregate to one part by weight magnesium oxide and present in the ratio of 3–5 parts by weight coarse aggregate to 1–3 parts by weight fine aggregate and 1–10 percent by weight of reinforcing glass fibers.

4. A structural board of the type claimed in claim 3 in which the core of bonded glass fibers has a density of 6–20 pounds per cubic foot.

5. A structural board as claimed in claim 2 in which a plurality of openings are formed to extend partially through the board for acoustical insulation.

6. A structural board as claimed in claim 2 in which a layer of a cementitious composition of the type described is integrated with one face of the board while an asphaltic layer is integrated with the other surface of the board to provide a vapor barrier.

7. A structural board comprising a core of glass fibers bonded into a porous layer, endless glass fibers stitched in closely spaced apart relation back and forth through the board with looped ends extending outwardly from the surfaces thereof and a layer of an inorganic cementitious material integrated with the surface of the board from which the looped ends extend to embed the looped ends therein, the cementitious composition consisting essentially of a cured magnesium oxysulphate cement, from 1 to 10 percent by weight, reinforcing glass fibers and siliceous aggregate.

8. A structural board comprising a core of glass fibers bonded into a porous layer, endless glass fibers stitched in closely spaced apart relation back and forth through the board with looped ends extending outwardly from the surfaces thereof and a layer of an inorganic cementitious material integrated with the surface of the board from which the looped ends extend to embed the looped ends therein, the cementitious composition being formulated of 3–9 molecular equivalents magnesium oxide to one molecular equivalent magnesium sulphate, siliceous aggregate and 2–5 percent by weight reinforcing glass fibers.

9. A structural board comprising a core of glass fibers bonded into a porous layer, endless glass fibers stitched back and forth through the core and having looped ends extending freely from the surfaces thereof, and a cementitious composition coating the surface of the board to embed the looped ends therein, the cementitious composition consisting essentially of magnesium oxide and magnesium sulphate present in the ratio of 3–9 molecular equivalents magnesium oxide to one molecular equivalent magnesium sulphate, 1–6 parts by weight aggregate to one part by weight magnesium oxide and from 1 to 5 per cent by weight reinforcing glass fibers having a length ranging from ¼–4 inches.

10. A structural board comprising a core of glass fibers bonded into a porous layer, endless glass fibers stitched back and forth through the core and having looped ends extending freely from the surfaces thereof, and a cementitious composition coating the surface of the board to embed the looped ends therein, the cementitious composition consisting essentially of 3–6 molecular equivalents magnesium oxide to one molecular equivalent magnesium sulphate, 1–6 parts by weight of aggregate to one part by weight magnesium oxide and present in the ratio of 3–5 parts by weight coarse aggregate to 1–3 parts by weight fine aggregate, and from 1–5 percent by weight glass fibers having a length ranging from ¼–4 inches.

11. A structural board as claimed in claim 10 in which the looped ends of the stitched fibers extend from both of the broad faces of the board, one of the surfaces having integrated therewith a cementitious composition of the type described, and an asphaltic composition integrated with the other surface to provide a moisture barrier in which the looped ends of the glass fibers are embedded.

12. A structural board as claimed in claim 10 in which a plurality of acoustical openings are formed in the opposite faces of the board to extend partially therethrough.

References Cited in the file of this patent

UNITED STATES PATENTS

| Number | Name | Date |
|---|---|---|
| 615,352 | Gallinowsky | Dec. 6, 1898 |
| 1,761,461 | Apel | June 3, 1930 |
| 2,008,718 | Jenkins | July 23, 1935 |
| 2,097,796 | Kennedy | Nov. 2, 1937 |
| 2,137,756 | Gould et al. | Nov. 22, 1938 |
| 2,204,581 | Denning | June 18, 1940 |
| 2,252,157 | Bergin et al. | Aug. 12, 1941 |
| 2,296,553 | Heritage et al. | Sept. 22, 1942 |
| 2,321,522 | Sands | June 8, 1943 |
| 2,444,347 | Greger | June 29, 1948 |
| 2,500,665 | Courtright | Mar. 14, 1950 |
| 2,641,561 | Black | June 9, 1953 |